United States Patent
Yaklin

(10) Patent No.: US 11,421,805 B2
(45) Date of Patent: Aug. 23, 2022

(54) TELESCOPING METER FLANGE

(71) Applicant: A. Y. McDonald Mfg. Co., Dubuque, IA (US)

(72) Inventor: Sebastian Yaklin, Dubuque, IA (US)

(73) Assignee: A. Y. McDonald Mfg. Co., Dubuque, IA (US)

( * ) Notice: Subject to any disclaimer, the term of this patent is extended or adjusted under 35 U.S.C. 154(b) by 84 days.

(21) Appl. No.: 17/102,987

(22) Filed: Nov. 24, 2020

(65) Prior Publication Data

US 2021/0080037 A1     Mar. 18, 2021

Related U.S. Application Data

(62) Division of application No. 15/699,450, filed on Sep. 8, 2017, now Pat. No. 10,851,924.

(51) Int. Cl.
*F16L 27/12* (2006.01)
*G01F 15/18* (2006.01)
*F16L 23/00* (2006.01)
*F16L 23/028* (2006.01)
*E03B 7/07* (2006.01)

(52) U.S. Cl.
CPC ....... *F16L 27/12751* (2019.08); *F16L 23/003* (2013.01); *F16L 23/0286* (2013.01); *G01F 15/185* (2013.01); *E03B 7/072* (2013.01)

(58) Field of Classification Search
CPC ... F16L 23/003; F16L 27/12; F16L 27/12751; G01F 15/185
USPC ........................................................ 285/302
See application file for complete search history.

(56) References Cited

U.S. PATENT DOCUMENTS

| | | | | |
|---|---|---|---|---|
| 5,098,132 | A  * | 3/1992 | Burton | F16L 27/12751 |
| 8,220,839 | B2 * | 7/2012 | Hall | F16L 27/125 |
| | | | | 285/302 |
| 2013/0175039 | A1* | 7/2013 | Guidry | F16L 27/12751 |
| 2016/0158989 | A1* | 6/2016 | Schroder | F16L 51/00 |

* cited by examiner

*Primary Examiner* — Zachary T Dragicevich
(74) *Attorney, Agent, or Firm* — Wood, Phillips, Katz, Clark & Mortimer

(57) ABSTRACT

A telescoping fluid coupling (10,110) is provided for use with a fluid flow device (12) and includes a coupling body (14,114) having a fluid port (16,116) extending along a longitudinal axis (18,118). A retainer (20,120) is fixed to the body (14,114) and includes a retaining shoulder (26,126). A flange (22,122) is mounted to the fluid port (16,116) and includes a radially inwardly facing guide surface (36,136) that surrounds a mount surface (24,124) and extends longitudinally along the axis (18,118) to provide guided, sliding translation of the guide surface (36,136) relative to the mount surface (24,124) along the axis (18,118). The flange (22,122) further includes a stop shoulder (38,138) to engage the retaining shoulder (26,126) to limit the translation of the flange (22,122) along the axis (18,128).

5 Claims, 10 Drawing Sheets

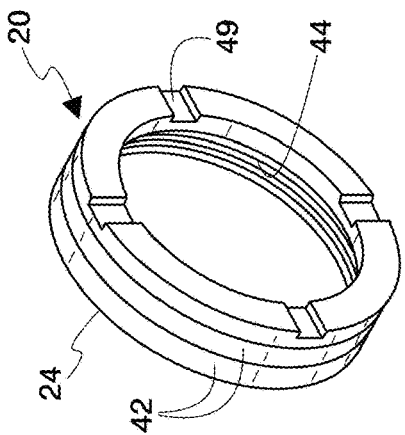
Fig. 7
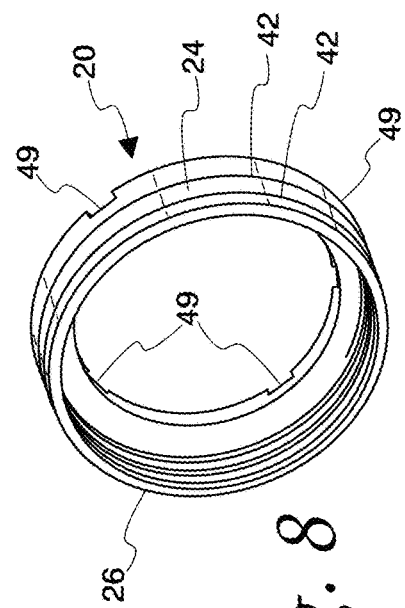
Fig. 8
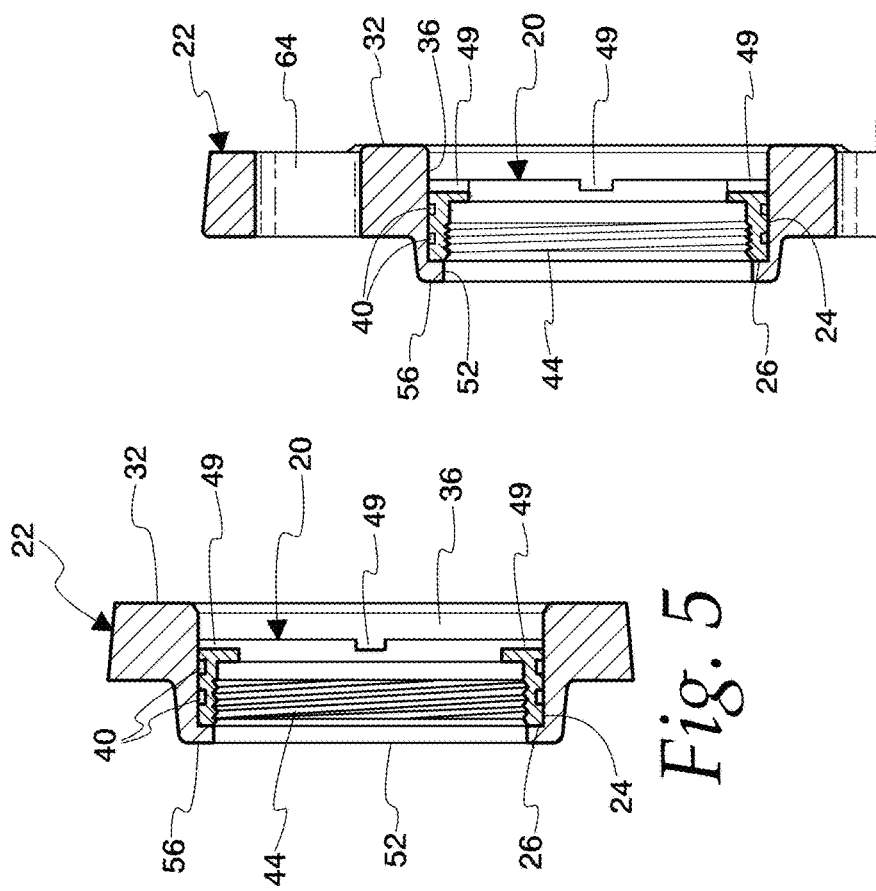
Fig. 6
Fig. 5

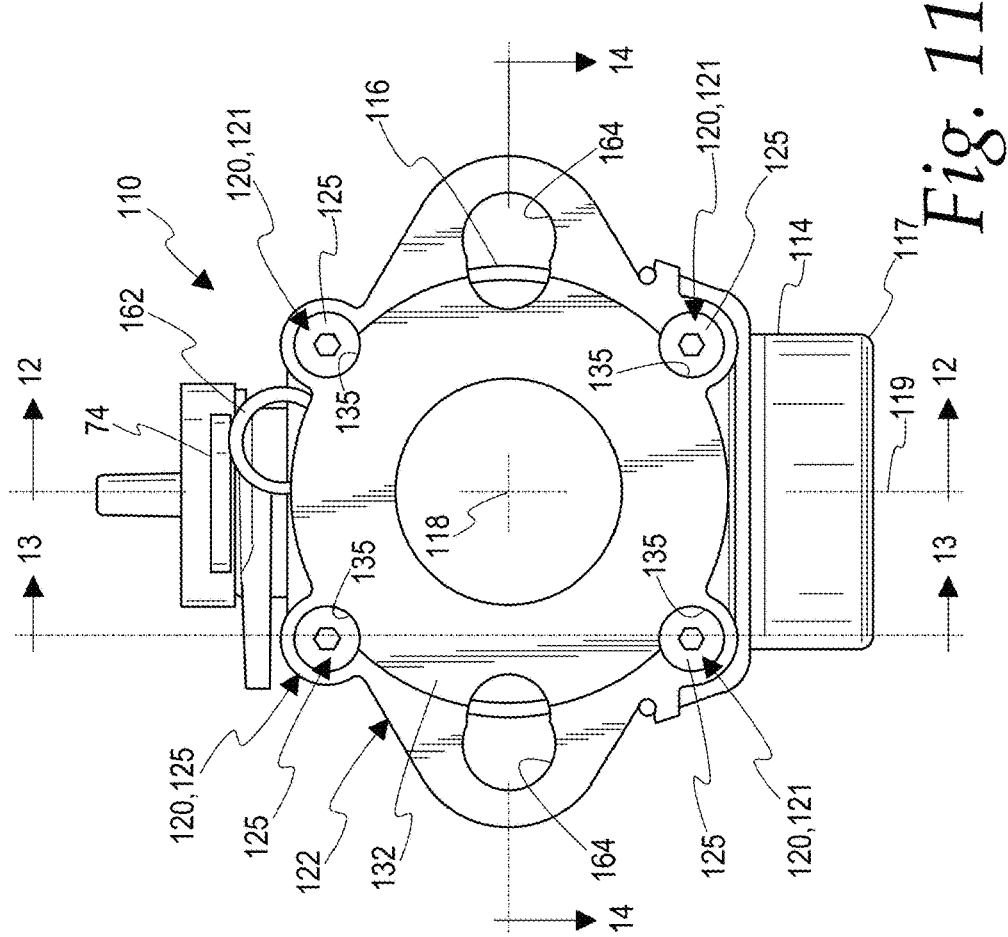
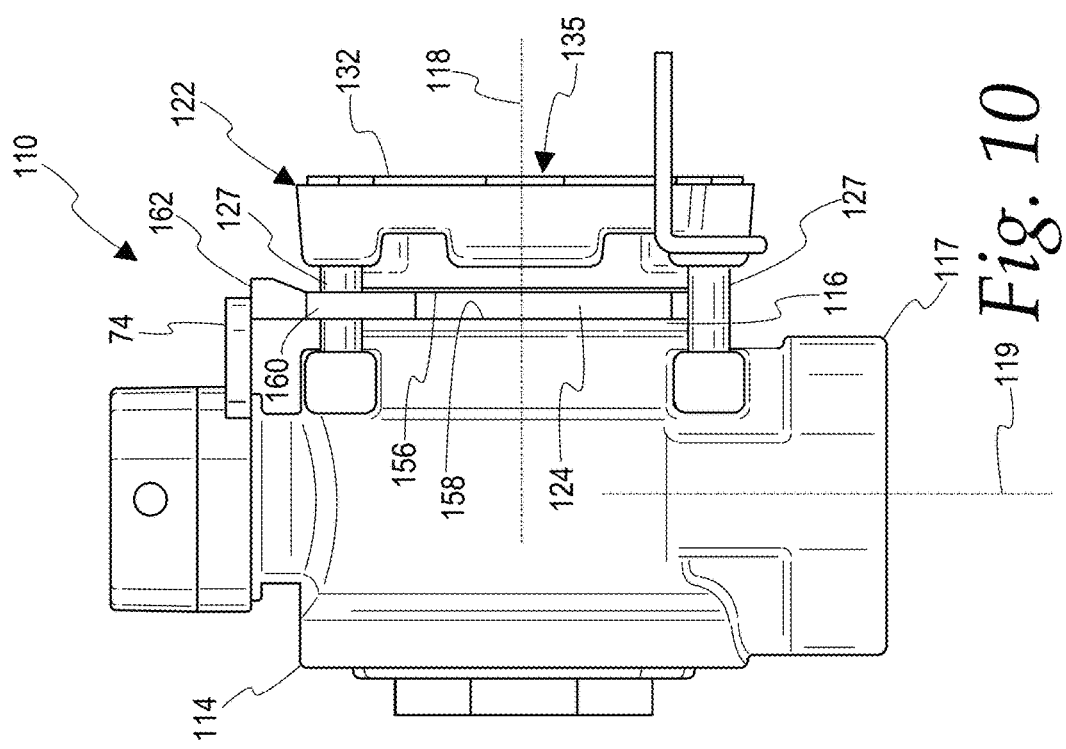
Fig. 11
Fig. 10

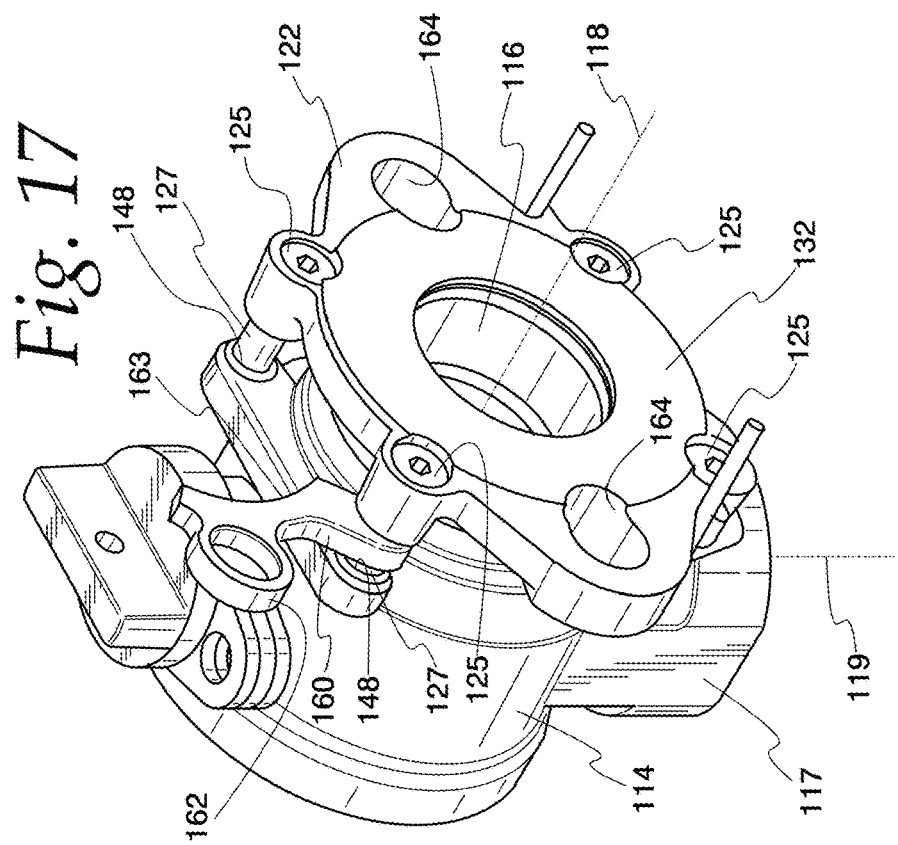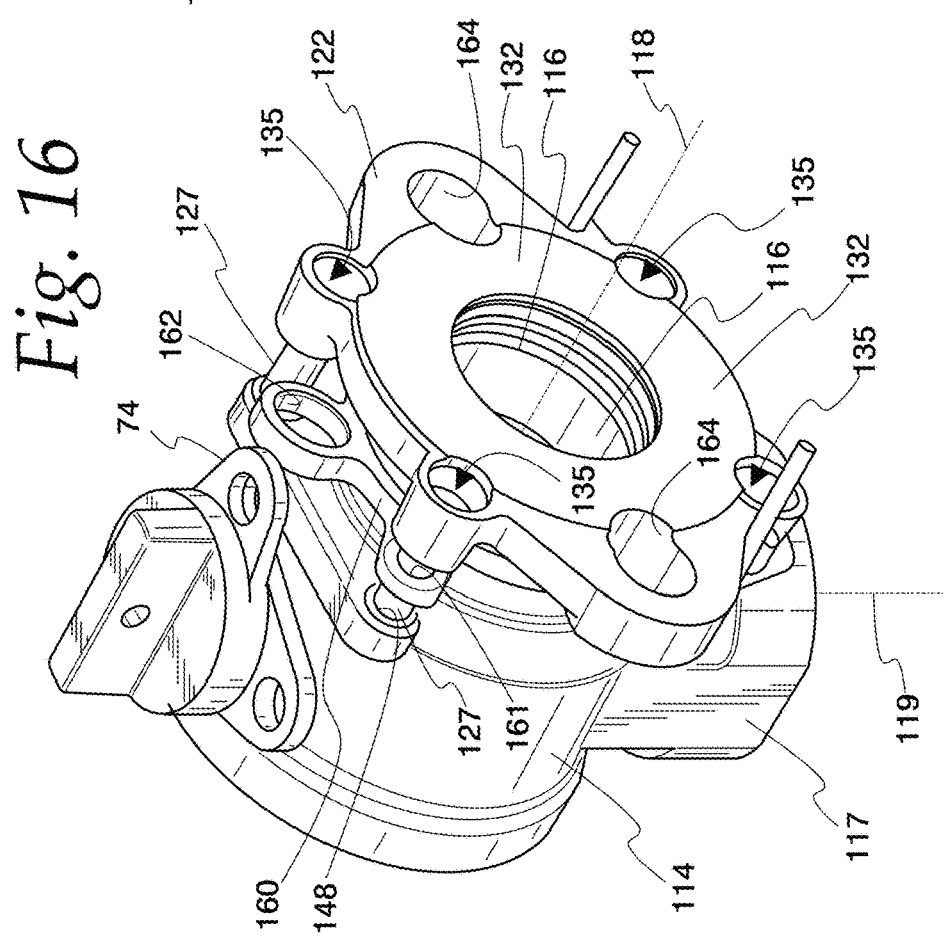

TELESCOPING METER FLANGE

CROSS-REFERENCE TO RELATED APPLICATIONS

This application is a divisional of U.S. Ser. No. 15/699,450, filed Sep. 8, 2017, the disclosure of which is hereby incorporated by reference.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to fluid flow devices having flanged fluid connections, and in particular applications to fluid flow meters utilized by public utilities to measure the volume of a fluid flow provided to a user, and in even more particular applications to water meters used to measure the volume of water provided to a user, and to the so-called "meter setter" into which such fluid flow meters are installed.

BACKGROUND OF THE INVENTION

Public utilities commonly use fluid flow meters, such as water meters, to measure the volume of a fluid flow, such as the volume of water flow, that is utilized by a customer or user of the public utility. The volume measured by the fluid flow meter is used to calculate the bill, such as the water bill. Such meters are installed in what is typically referred to as a "meter setter". Meter setters can be as simple as a threaded or flanged fitting on both sides of the meter, or can be a rigid assembly that contains pipes, tubes, valves, check valves and flanged fittings.

The spacing in the meter setter into which the water meter is installed, typically referred to as "the meter setter spacing" is very critical, particularly when the meter being installed is one and a half inch or larger with flanged fittings. If the meter setter spacing is too large, the meter will fit in loosely and tightening of the meter setter assembly will put stresses on the piping. Similarly, if the meter setter spacing is too small, then the water meter won't fit without spreading apart the meter setter which will also put stresses on the piping. In either case, the installation of the meter can be a difficult task. To further complicate matters, such meters are often installed in locations where space is limited for the installer to work which makes the task of either forcing apart the meter setter and/or supporting the weight of the water meter, while keeping the alignment of the flanges, gaskets, nuts, and bolts of the fittings, very difficult.

Typically, water meter connections are composed of a set of meter flanges bolted together. Meter flanges can be either round or oval in shape with sealing faces either raised or flush. Concentric grooves can be cut into the seal faces of the meter flanges or the seal faces can be smooth. Flange gaskets are then installed between the two flanges, which are held together with a plurality of threaded fasteners, typically bolts. When the meter flanges are tightened against each other, the gasket becomes compressed and can stick to the flange faces. Furthermore, the flange faces are typically a large area and the material of the gaskets can flow into the face grooves, which further increases the difficulty of disassembling an installed meter from a meter setter.

The disclosed telescoping coupling can address some or all of the above difficulties.

SUMMARY OF THE INVENTION

In accordance with one feature of the invention, a telescoping fluid coupling is provided for use with a fluid flow device. The coupling includes a coupling body having a fluid port extending along a longitudinal axis; a retainer fixed to the body, the retainer having a retaining shoulder; a radially outwardly facing mount surface surrounding the fluid port; and a flange mounted to the fluid port for translation along the axis relative to the fluid port and configured to be fixed via a plurality of releasable fasteners to a mating flange to form a sealed connection therewith. The flange includes a face surface configured for sealed engagement with a mating face surface on a mating flange. The flange further includes a radially inwardly facing guide surface surrounding the mount surface and extends longitudinally along the axis. The guide surface has a sliding fit with the mount surface to provide guided, sliding translation of the guide surface relative to the mount surface along the axis. The flange also includes a stop shoulder located inboard of the retainer shoulder, the stop shoulder engaging the retaining shoulder to limit the translation of the flange along the axis relative to the fluid port. At least one gasket is located between the guide surface and the mount surface to create a seal between the guide surface and the mount surface.

As one feature, the retainer is fixed to the body by a threaded connection.

In one feature, the flange is mounted for rotation about the axis relative to the fluid port independent of any translation of the flange along the axis.

According to one feature, the at least one gasket is a pair of gaskets.

As one feature, the mount surface and the guide surface are cylindrical surfaces centered on the axis and the at least one gasket includes an annular gasket.

In one feature, the flange includes an end surface facing opposite of the face surface. The fluid port includes a spacer surface spaced inboard of the end surface, and the telescoping coupling further includes a spacer that is movable between a first position wherein the spacer is sandwiched between the end surface and the spacer surface to limit translation of the flange along the longitudinal axis, and a second position wherein the spacer is not located between the end surface and the spacer surface.

According to one feature, the flange includes a pair of bores configured to receive threaded fasteners to fix the flange to a mating flange to form as sealed connection therewith.

As one feature, a valve assembly is mounted in the coupling body to control fluid flow through the fluid port. In a further feature, the valve assembly includes a ball valve rotatably mounted in the coupling body.

According to one feature, the coupling body includes another fluid port.

As one feature, the fluid ports extend along longitudinal axes that are parallel to each other.

In one feature, the fluid ports extend along longitudinal axes that are perpendicular to each other.

According to one feature, the retainer includes a threaded fastener having a head defining the retaining shoulder. The flange includes a bore receiving the threaded fastener for translation relative to the flange parallel to the axis, and a surface surrounding the bore and defining the stop shoulder. The body includes a threaded bore having internal threads engaged with external threads on the threaded fastener to fix the threaded fastener to the body.

As one feature, the retainer includes a plurality of retaining shoulders, and a plurality of threaded fasteners, each threaded fastener having a head defining one of the retaining shoulders. The flange includes a plurality of bores and a plurality of stop shoulders, each bore receiving one of the threaded fastener for translation relative to the flange parallel to the axis and having one of the stop shoulders surrounding the through bore for engagement with the retaining shoulder on the one of the threaded fasteners. The body includes a plurality of threaded bores, each threaded bore having internal threads engaged with external threads on one of the threaded fastener to fix the threaded fastener to the body. In a further feature, the mount surface is a cylindrical surface formed on the body and centered on the axis, and the threaded bores are circumferentially spaced from each other about the axis.

According to one feature, the retainer is mounted on the fluid port, the mount surface is defined on the retainer, and the retaining shoulder extends between the fluid port and the mount surface.

As one feature, the mount surface and the guide surface are cylindrical surfaces centered on the axis. The stop shoulder is an annular shoulder centered on the axis. The retaining shoulder is an annular shoulder centered on the axis. The at least one gasket comprises an annular gasket.

In one feature, the at least one gasket is a pair of annular gaskets. The retainer includes a pair of radially outwardly opening annular grooves, one of the annular gaskets mounted in one of the annular grooves, the other of the annular gaskets mounted in the other of the annular grooves.

According to one feature, the retainer is mounted on a distal end of the fluid port, and the fluid port includes external threads formed on the distal end that mate with internal threads formed on the retainer to mount the retainer to the fluid port.

As one feature, the fluid port includes a radially outwardly facing cylindrical surface extending from the retaining shoulder toward a remainder of the coupling body. The flange includes a radially inwardly facing cylindrical surface that surrounds the radially outwardly facing cylindrical surface of the fluid port and extends from the stop shoulder toward the remainder of the coupling body. The radially outwardly facing cylindrical surface of the fluid port and the radially inwardly facing cylindrical surface of the flange have a fit that provides guided translation of the radially inwardly facing cylindrical surface of the flange along the radially outwardly facing cylindrical surface of the fluid port over a length of the radially outwardly facing cylindrical surface of the fluid port extending along the longitudinal axis.

In one feature, the flange is an oval flange.

According to one feature, the flange is a circular flange.

Other objects, features, and advantages of the invention will become apparent from a review of the entire specification, including the appended claims and drawings.

BRIEF DESCRIPTION OF THE DRAWINGS

FIG. 5 is a view similar to that of FIG. 3 but only showing a flange and retainer of the fluid coupling;

FIG. 6 is a view similar to FIG. 4, but again only showing the flange and retainer;

FIG. 7 is a perspective view from the front of the retainer shown in FIGS. 3-6;

FIG. 8 is a perspective view from the rear of the retainer shown in FIGS. 2-7;

FIG. 10 is a side elevation view showing another embodiment of a telescoping fluid coupling according to this disclosure;

FIG. 11 is a front elevation view of the telescoping fluid coupling of FIG. 10;

FIG. 16 is a perspective view of the telescoping fluid coupling of FIGS. 11-15, showing the telescoping flange in the extended position;

FIG. 17 is a view similar to FIG. 16, but showing the telescoping flange in the retracted position;

DETAILED DESCRIPTION OF THE PREFERRED EMBODIMENT

Figure 1:
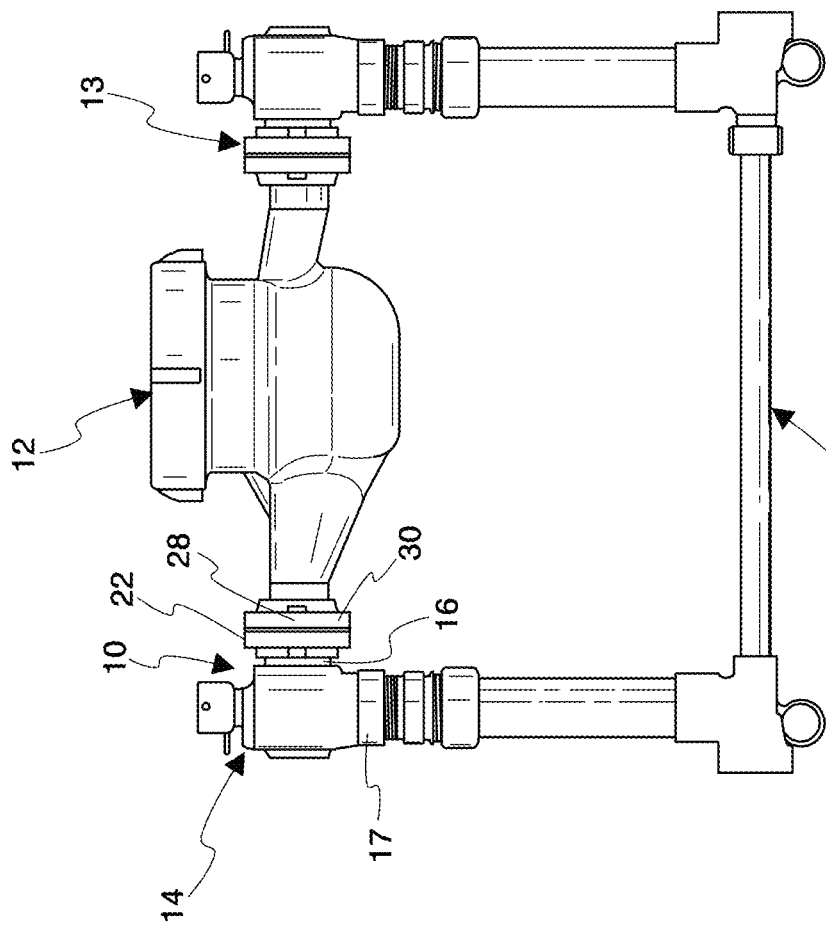
FIG. 1 is a side elevation view of a fluid system in the form of a meter setter and a fluid meter, the fluid system including a telescoping fluid coupling according to this disclosure.

With reference to FIG. 1, one embodiment of a telescoping coupling 10 is shown for use in a fluid flow system, such as in a system including a meter setter 11 for a fluid flow meter 12. Typically, in such systems the meter setter 11 will have a stationary flange or coupling 13 opposite from the telescoping coupling 10 and the meter 12 will be connected between the couplings. It should be appreciated that there are many types and configurations of suitable meters 12 and meter setters 11 and that the telescoping coupling 10 disclosed herein is not dependent upon the particular details of the remainder of the meter 12 or meter setter 11. Further, it should be understood that while the telescoping coupling 10 is described and shown herein in connection with a fluid flow meter 12 and a meter setter 11, the inventive concepts of the telescoping coupling 10 can be utilized with many types of fluid flow systems and devices and is not limited to any particular type of fluid flow system or device unless expressly stated in one of the appended claims.

Figure 2:
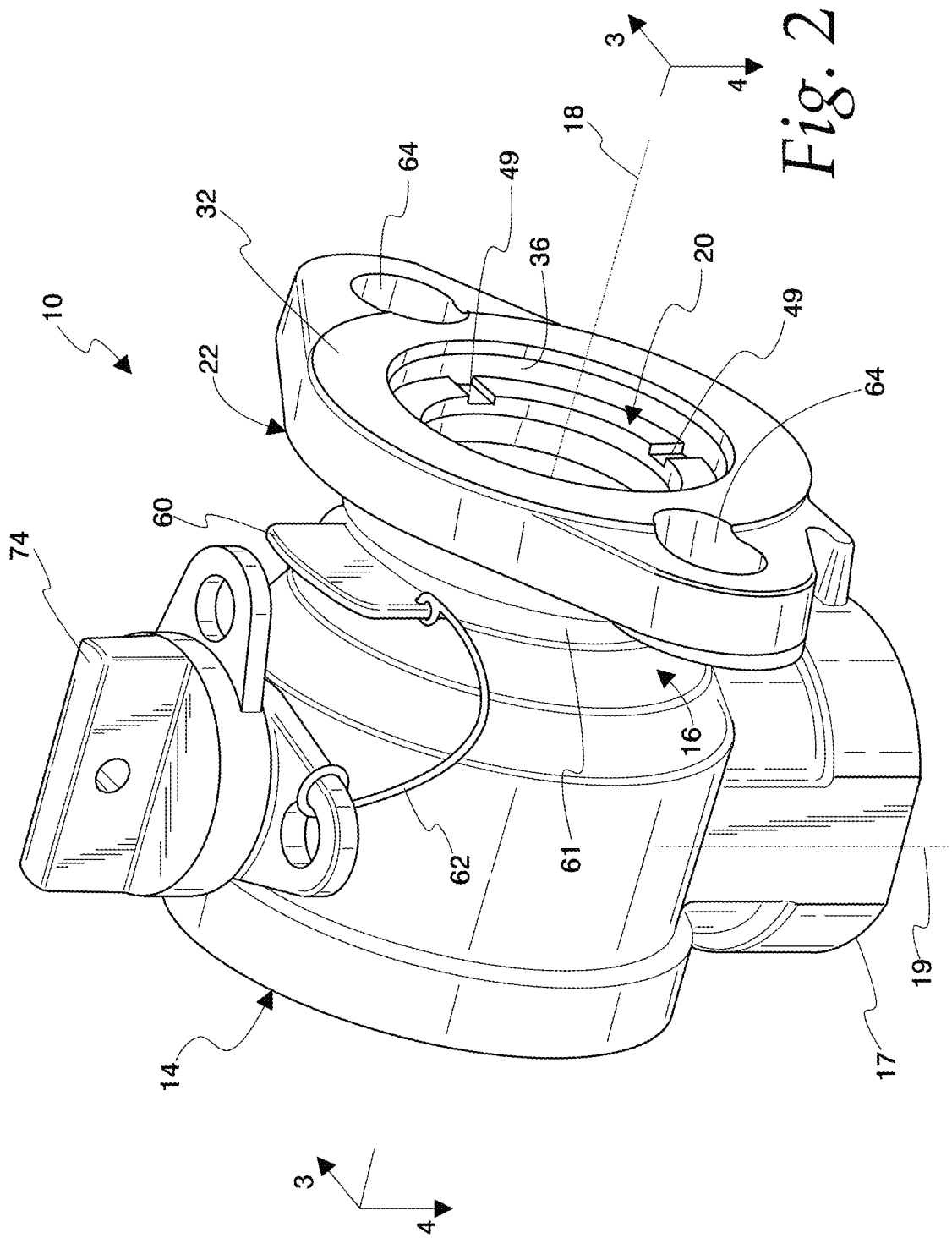
FIG. 2 is a perspective view of the telescoping fluid coupling shown in FIG. 1.
Figure 3:
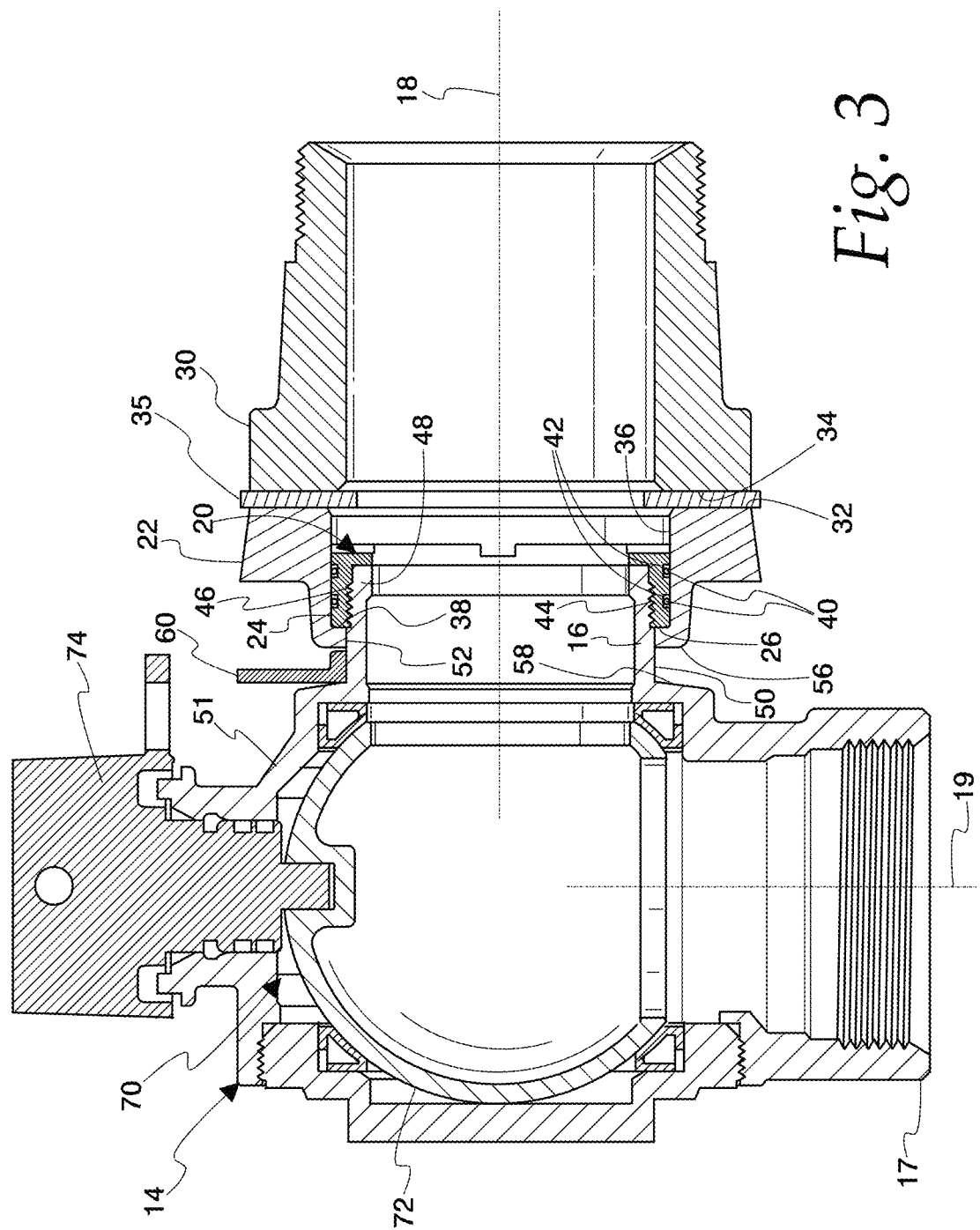
FIG. 3 is a section view taken along line 3-3 in FIG. 2 of the fluid coupling showing the coupling connected with a mating flange.
Figure 4:
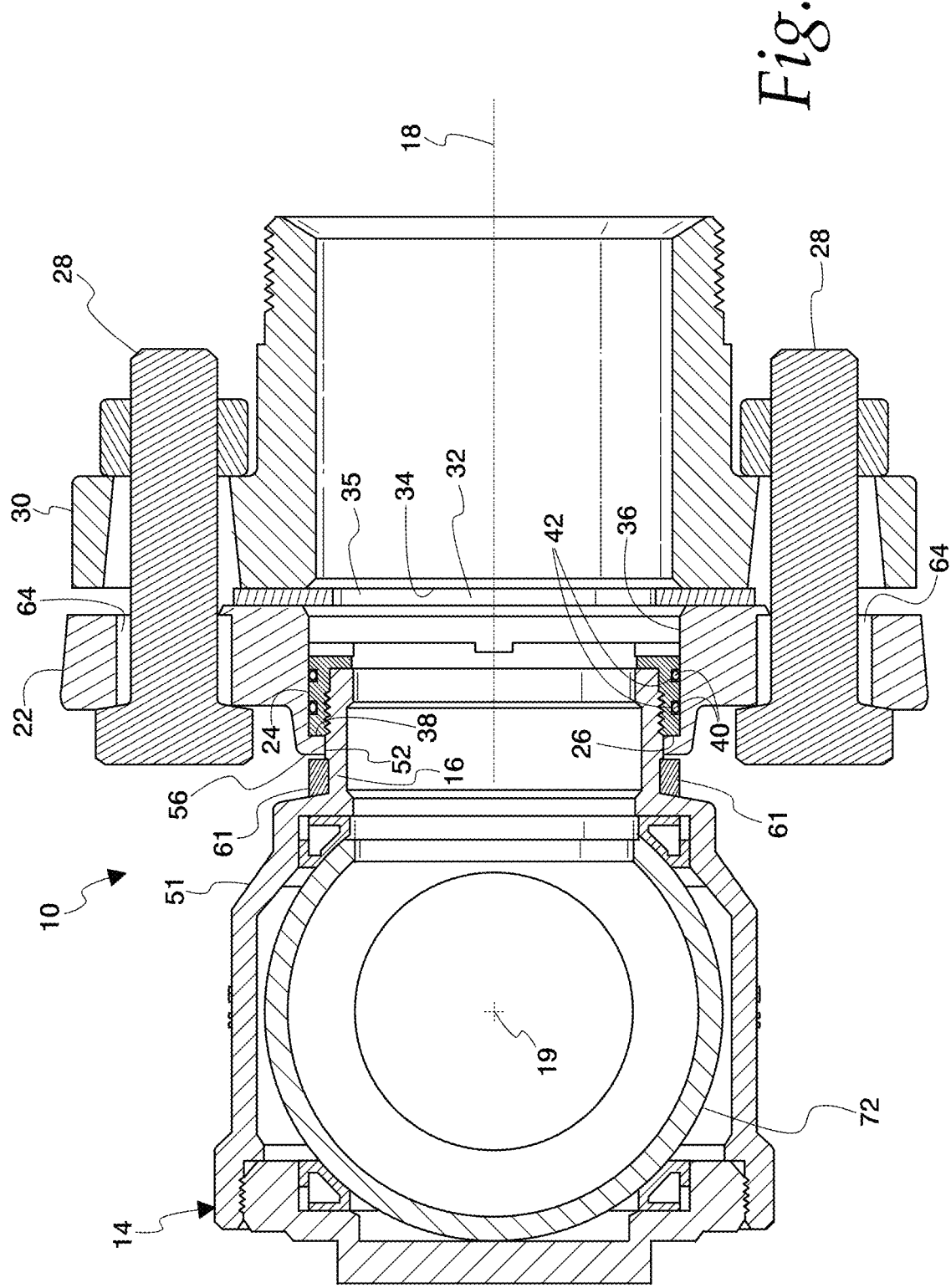
FIG. 4 is a section view taken along line 4-4 again showing the fluid coupling connected to a mating flange.

The embodiment of the telescoping coupling 10 illustrated in FIGS. 1-9 includes a coupling body 14 having a pair of fluid ports 16 and 17, each extending along a respective longitudinal axis 18 and 19. As best seen in FIGS. 3 and 4, the coupling 10 further includes a retainer 20 mounted on the fluid port 16, and a flange 22 mounted on the fluid port 16 for translation along the axis 18 relative to the fluid port 16. The retainer 20 includes a radially outwardly facing mount surface 24 surrounding the fluid port 16, and a retaining shoulder 26 extending between the fluid port 16 and the mount surface 24.

The flange 22 is configured to be fixed by a plurality of releasable fasteners 28 to a mating flange 30 to form a sealed connection therewith. The flange 22 includes a face surface 32 configured for sealed engagement with a mating face surface 34 on the mating flange 30, with the face surface 32 located outboard of the retainer 20 in the illustrated embodiment shown in FIGS. 2 and 3. In this regard, in the illustrated embodiment, a gasket 35 is provided to be sandwiched between the surfaces 32 and 34 to form a fluid tight seal therewith. It should be understood that while specific forms of the surfaces 32 and 34 and gasket 35 are shown herein, any suitable surfaces and/or gaskets may be utilized according to the invention, many of which are known. The flange 22 further includes a radially inwardly facing guide surface 36 that surrounds the mount surface 24 and extends longitudinally along the axis 18, with the guide surface 36 having a sliding fit with the mount surface 24 to provide guided, sliding translation of the guide surface 36 relative to the mount surface 24 along the axis 18. The flange 22 further includes a stop shoulder 38 extending between the guide surface 36 and the fluid port 16. The stop shoulder 38 is located inboard of the retainer 20 so as to engage the retaining shoulder 26 on the retainer 20 to limit the outboard translation of the flange 22 along the axis 18 relative to the fluid port 16. In the illustrated embodiment, the flange 22 is mounted for rotation about the axis 18 relative to the fluid port 16 independent of any translation of the flange 22 along the axis 18. In the illustrated embodiment, the mount surface 24 and the guide surface 36 are closely conforming cylindrical surfaces centered on the axis 18, the stop shoulder 38 is an annular shoulder centered on the axis 18, and the retaining shoulder 26 is an annular shoulder centered on the axis 18.

In the illustrated embodiment, a pair of gaskets in the form of O-ring seals 40 are located between the guide surface 36 and the retainer 20 to create a fluid seal between the guide surface 36 and the retainer 20. The retainer 20 includes a pair of radially outwardly opening annular grooves 42 with each of the grooves mounting one of the O-ring seals 40. It should be appreciated that while the specific form of the gaskets shown in the illustrated embodiments will be desirable in many applications, any suitable gasket and any number of gaskets, many of which are known, may be desirable depending upon the requirements of any particular application. Accordingly, no limitation to a specific gasket or to a specific number of gaskets is intended unless expressly recited in one of the appended claims.

The retainer 20 is joined to the fluid port 16 by mating internal and external screw threads 44 and 46 on the retainer 20 and the fluid port 16, respectively, with the external screw threads 46 being located on a distal end 48 of the fluid port 16 to mount the retainer 20 to the distal end 48. Torque tool engagement features 49 can be included on the retainer 20 in order to allow a tool to be utilized for rotating the retainer 20 for actuating the engagement of the screw threads 44 and 46. It should be appreciated that while the screw threads 44 and 46 are desirable in many applications, other suitable connections between the retainer 20 and the fluid port 16 may be desirable depending upon the requirements of each application, and accordingly, no limitations to a specific type of connection between the retainer 20 and the port 16 is intended unless expressly recited in one of the appended claims.

In the illustrated embodiment, the fluid port 16 includes a radially outwardly facing cylindrical surface 50 extending from the retaining shoulder 26 towards a remainder 51 of the coupling body 14. The flange 22 includes a radially inwardly facing cylindrical surface 52 that surrounds the radially outwardly facing cylindrical surface 50 of the fluid port 16 and extends from the stop shoulder 38 toward the remainder 51 of the coupling body 14. The radially outwardly facing cylindrical surface 50 of the fluid port 16 and the radially inwardly facing cylindrical surface 52 of the flange 22 have a fit that provides sliding translation of the surface 52 along the surface 50 over a length of the surface 50 extending along the longitudinal axis 18 and that allows rotation of the flange 22 about the axis 18.

In the illustrated embodiment, the flange 22 includes an annular end surface 56 spaced inboard of the stop shoulder 38 and facing opposite of the face surface 32. The fluid port 16 includes an annular spacer surface 58 spaced inboard of the end surface 56. As an option, the coupling 10 can further include a removable spacer 60 that engages between the surfaces 56 and 58 to limit translation of the flange 22 along the longitudinal axis 18 during assembly of the flange 22 to the mating flange 30. This is useful to help ensure that the flange 22 is set at a predetermined position along its axial travel range. As best seen in FIGS. 2 and 4, in the illustrated embodiment, the spacer 60 includes a pair of arcuate legs 61 that are shaped to conform to the cylindrical surface 50 of the port 16 and are resilient so as to provide a snap fit connection of the spacer 60 to the port 16 via engagement of the legs 61 with the surface 50. As seen in FIG. 2, in some embodiments it may be desired to include a tether 62 that attaches the spacer 60 to the coupling 10 so that the spacer 60 will not be lost after assembly of the coupling 10 to the meter 12.

Figure 9:
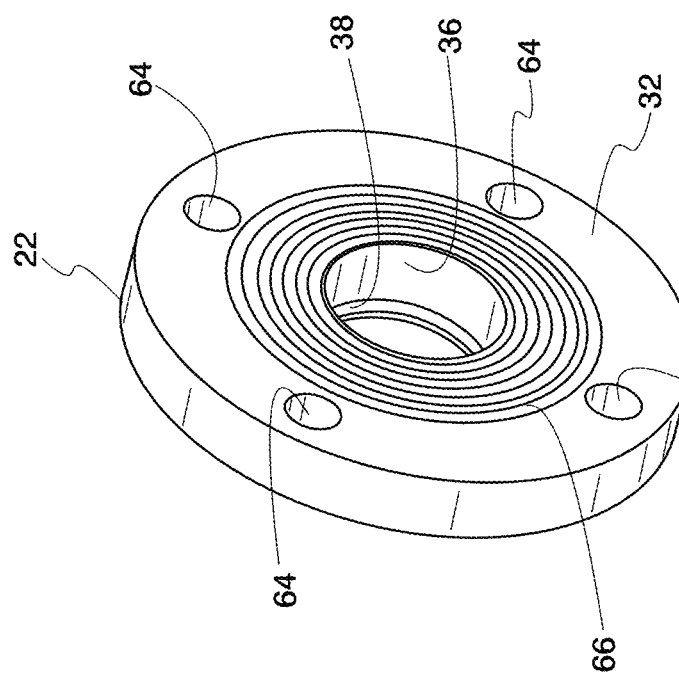
FIG. 9 is a perspective view of another embodiment of the flange for the fluid coupling disclosed herein.

In the illustrated embodiment, the flange 22 is oval in shape and includes a pair of through holes or bores 64 configured to receive the threaded fasteners 28, which are shown in the form of bolts 28, to fix the flange 22 to the mating flange 30. As best seen in FIG. 9, in another embodiment, the face surface 32 includes a plurality of annular seal ribs 66 and is circular in shape and includes four bores 64. As seen in FIG. 1, in one embodiment, the face surface is flat/planar and smooth. It should be appreciated that any suitable face surface 32 and/or geometric shape, many of which are known, can be utilized for the flange 22.

In the illustrated embodiment, the coupling 10 further includes a valve assembly 70 mounted in the coupling body 14 to control fluid flow through the fluid port 16 and the fluid port 17. In the illustrated embodiment, the valve assembly 70 includes an angled ball valve 72 rotatably mounted in the coupling body 14, with a manually operated valve stem 74 that is drivably engaged with the ball valve 72 to allow a user to selectively rotate the ball valve 72 between various flow positions. It should be appreciated that the valve assembly 70 can be any suitable valve assembly that is required for a particular application, including, without limitation, an in-line ball valve assembly, an in-line plug valve assembly, an angle plug valve assembly, an in-line check valve assembly, an angle check valve assembly, an in-line gate valve assembly, an angle gate valve assembly, an in-line globe valve assembly, an angle globe valve assembly, or any combination of such valve assemblies. Accordingly, it should be further understood that additional details of the valve assembly 70 are not critical to an understanding of the invention and that the claims are not intended to be limited to any specific valve assembly details unless expressly recited in one of the appended claims. Furthermore, it should be appreciated that the coupling 10 may not include any kind of a valve assembly and may simply be a straight pipe connection, or an angled pipe connection, or any other of the various waterworks or fluid flow related fittings.

It should be appreciated that the embodiments of the coupling 10 disclosed herein include a flange 22 that "telescopes" in and out, and that can also be rotated 360° to align the fastener features, such as the bolt holes or bores 62 with the corresponding features in a fluid flow device 12, such as a water meter 12. Because the flange 22 can telescope, it can be retracted away from the opposite flange 13 of the meter setter 11, thereby allowing room for the meter 12 to be either installed or removed from the stationary flange 13 of the meter setter 11. After the meter 12 is installed onto the stationary flange of the meter setter 11, the flange 22 can be telescoped to the proper length and rotated to orient the fastener features 62, thereby allowing the corresponding flange 30 of the meter 12 to be easily connected. It should be understood that this will eliminate stresses that could otherwise be present in the meter setter 11 and the forces that are often required to be applied to the meter setter 11 when installing a meter 12 into a conventional meter setter. It also ensures correct alignment of the flange gaskets and threaded fasteners.

Figure 13:
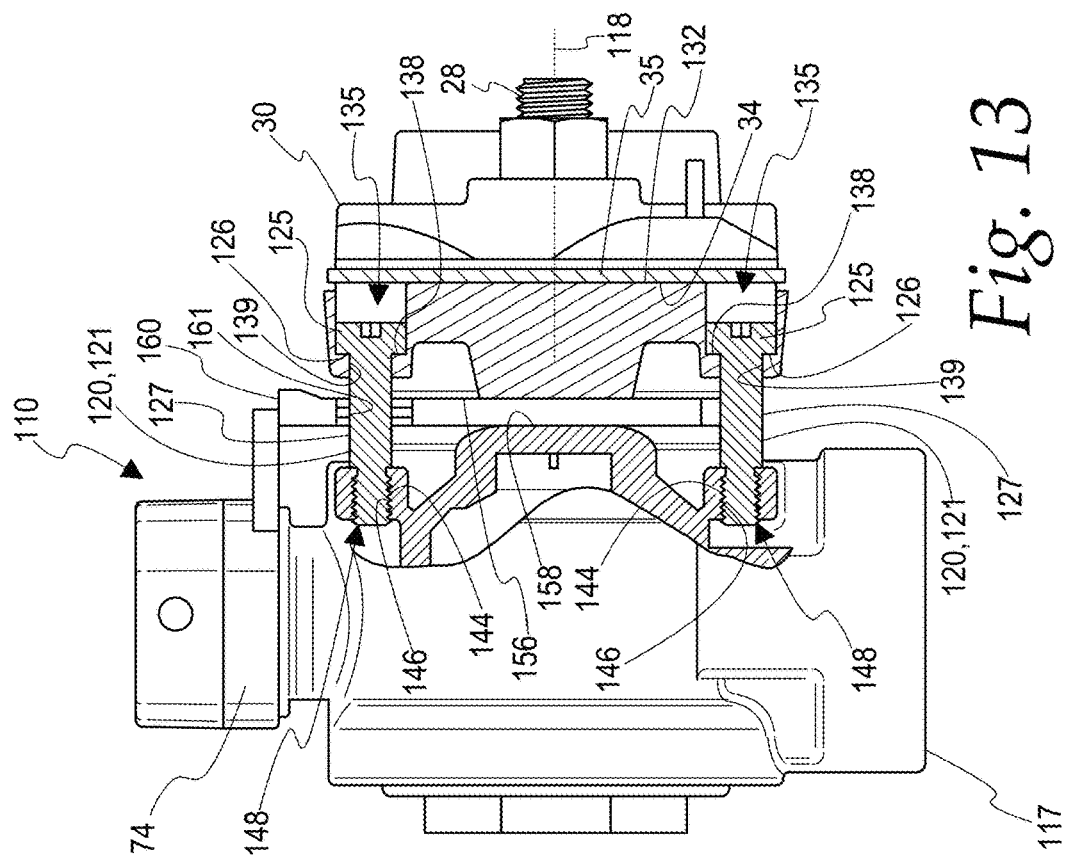
FIG. 13 is a side elevation view of the telescoping coupling of FIGS. 10-13 showing the telescoping flange attached to the flange of a fluid meter, and showing a portion broken-away along line 13-13 in FIG. 11.
Figure 12:
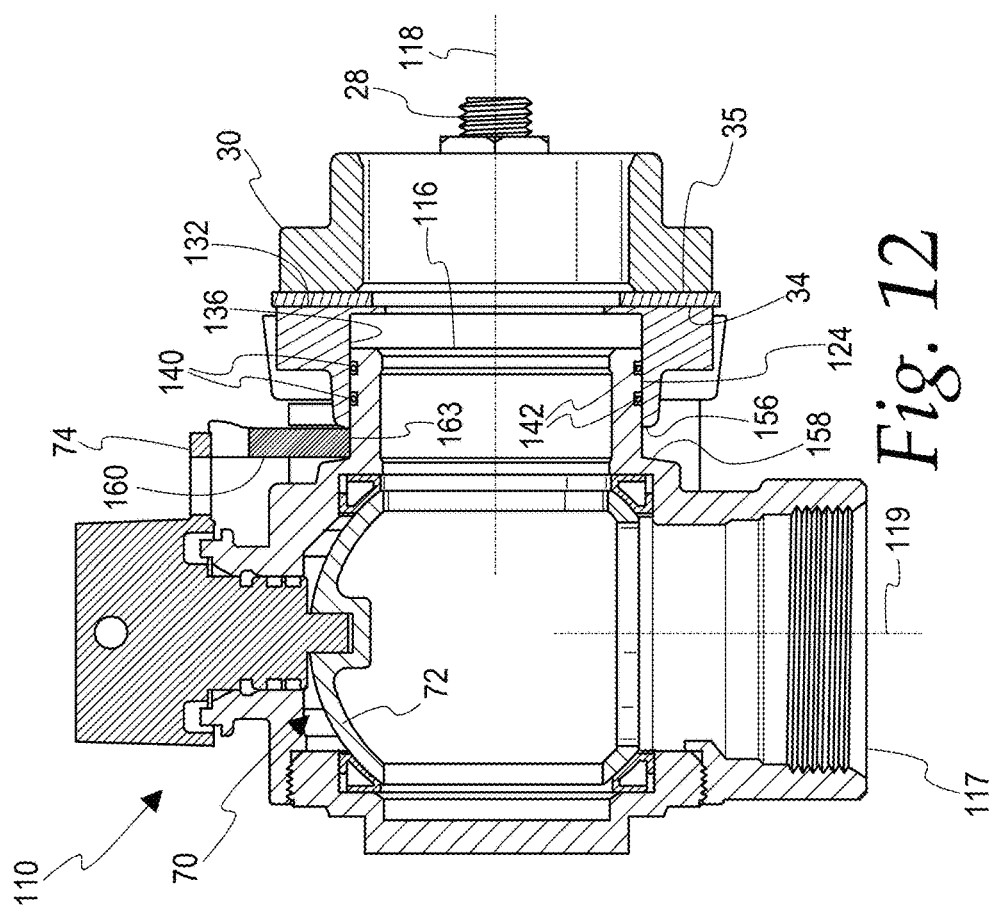
FIG. 12 is a section view taken along line 12-12 in FIG. 11 and showing the telescoping flange attached to the flange of a fluid meter.
Figure 15:
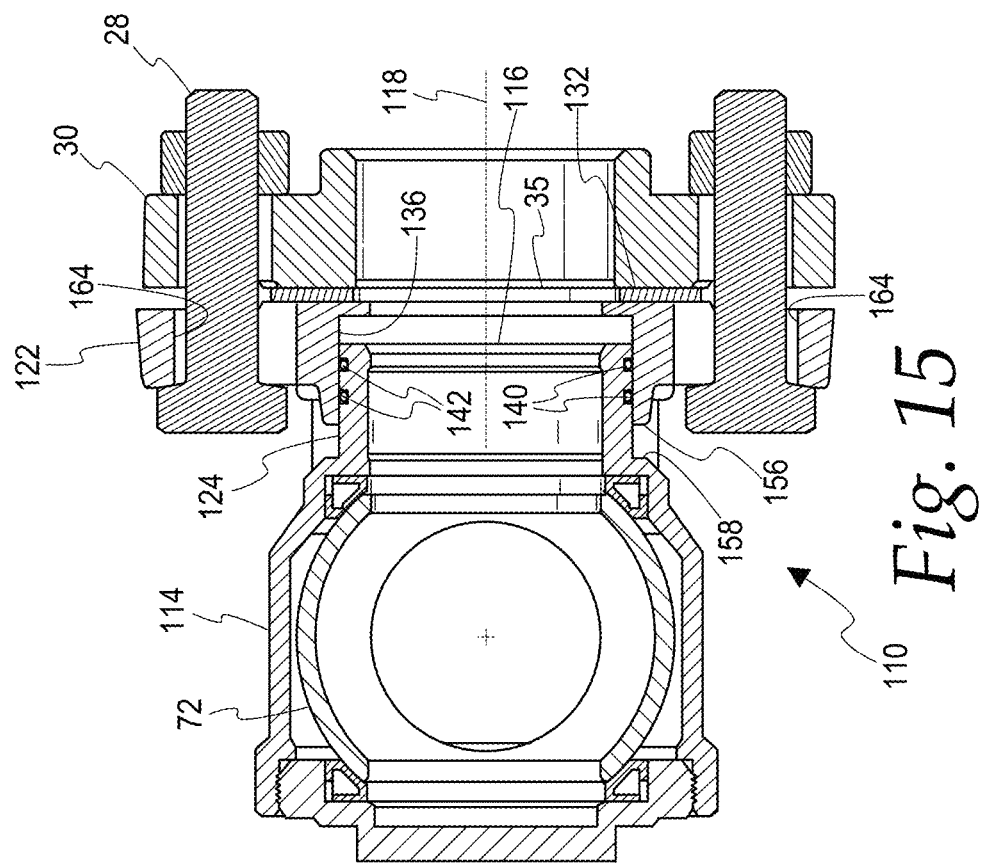
FIG. 15 is a view similar to FIG. 14, but showing the telescoping flange attached to the flange of a fluid meter, with the telescoping flange shown in an extended position.
Figure 14:
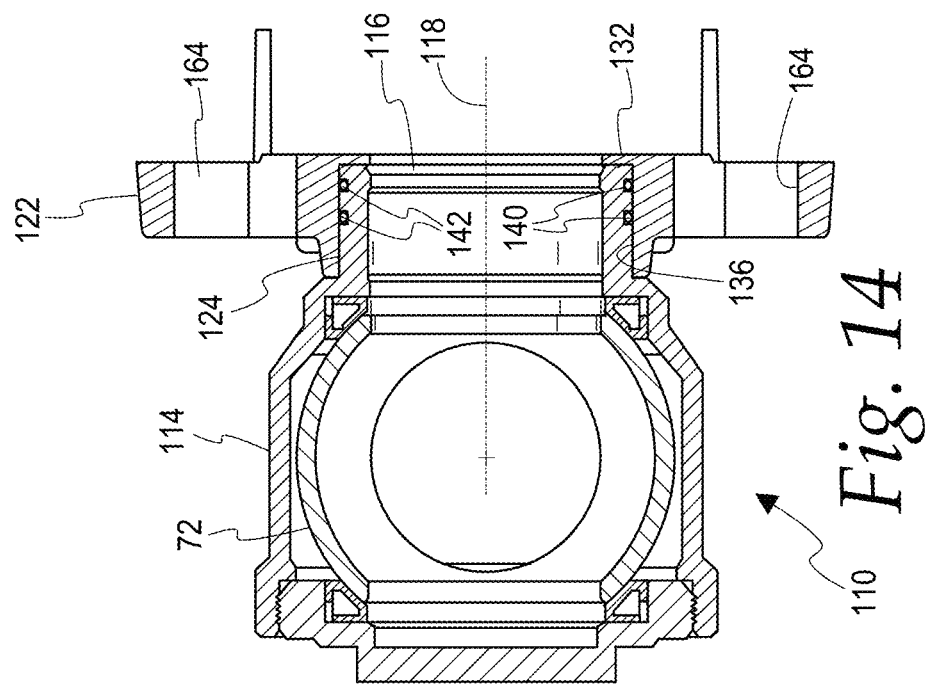
FIG. 14 is a section view taken along line 14-14 in FIG. 11 showing a telescoping flange in a retracted position.

With reference to FIGS. 10-19, another embodiment of a telescoping coupling 110 is shown for use in a fluid flow system, such as a system including the fluid meter setter 11. The telescoping coupling 110 includes a coupling body 114 having a pair of fluid ports 116 and 117, each extending along a respective longitudinal axis 118 and 119. As best seen in FIGS. 11 and 13, the coupling 110 includes a retainer 120 in the form of four threaded fasteners 121 fixed to the coupling body 114, and a flange 122 mounted on the fluid port 116 for translation along the axis 118 relative to the fluid port 116. As best seen in FIGS. 12, 14 and 15, a radially outwardly facing, cylindrical mount surface 124 is formed on the fluid port 116, surrounding the fluid port 116. As best seen in FIG. 13, each of the threaded fasteners 121 is provided in the form of a shoulder bolt 121 having a head 125 that defines an annular retaining shoulder 126 that extends radially outwardly from a cylindrical shaft/body 127 of the shoulder bolt 121. It should be appreciated that while the illustrated embodiment of the coupling 110 includes four of the shoulder bolts 121, in some applications it may be desirable for the retainer 120 to be provided in the form of more or fewer of the shoulder bolts 121, and in some applications the retainer 120 could be provided in the form of a single shoulder bolt 121. Indeed, in the illustrated embodiment, each of the shoulder bolts 121 can perform the function of the retainer 120 should any of the other shoulder bolts 121 fail or otherwise not be able to perform their intended function.

As with the flange 22 of the embodiment of FIGS. 1-9, the flange 122 of the embodiment of FIGS. 10-19 is configured to be fixed by a plurality of releasable fasteners 28 to the mating flange 30 to form a sealed connection therewith. As best seen in FIG. 13, the flange 122 includes a face surface 132 configured for sealed engagement with the mating surface 34 on the mating flange 30, with the face surface 132 located outboard of the shoulder bolts 121 which are located in countersunk bores 135 formed in the flange 122. As with the embodiment of FIGS. 1-9, a gasket 35 can be provided to be sandwiched between the surfaces 132 and 34 to form a fluid tight seal therewith, and it should be understood that while specific forms of the surfaces 132 and 34 and gasket 35 are shown herein, any suitable surfaces and/or gaskets may be utilized according to the invention, many of which are known.

As best seen in FIGS. 12, 14 and 15, the flange 122 further includes a radially inwardly facing guide surface 136 that surrounds the mount surface 124 and extends longitudinally along the axis 118, with the guide surface 136 having a sliding fit with the mount surface 124 to provide guided, sliding translation of the guide surface 136 relative to the mount surface 124 along the axis 118. As best seen in FIG. 13, each of the countersunk bores 135 includes an annular stop shoulder 138 that is located inboard of the retaining shoulders 126 on each of the corresponding shoulder bolts 121 to limit the outboard translation of the flange 122 along the axis 118 relative to the fluid port 116. In the illustrated embodiment, the mount surface 124 and the guide surface 136 are closely conforming cylindrical surfaces centered on the axis 118. Each of the countersunk bores 135 include a cylindrical portion 139 that provides a guided, sliding fit with the cylindrical shaft 127 on the corresponding shoulder bolt 121.

A pair of gaskets in the form of O-ring seals 140 are located between the guide surface 136 and the mount surface 124 to create a fluid seal between the guide surface 136 and the mount surface 124. A pair of radially outwardly opening annular grooves 142 are formed in the mount surface 124, with each of the grooves 142 mounting one of the O-ring seals 140. As with the embodiment of FIGS. 1-9, it should be appreciated that while the specific form of the gaskets shown in the illustrated embodiments will be desirable in many applications, any suitable gasket and any number of gaskets, many of which are known, may be desirable depending upon the requirements of any particular application. Accordingly, no limitation to a specific gasket or to a specific number of gaskets is intended unless expressly recited in one of the appended claims.

As shown in FIG. 13, each of the shoulder bolts 121 is joined to the body 114 by mating external and internal screw threads 144 and 146 on the shoulder bolt 121 and the body 114, respectively, with the internal screw threads 146 being located in threaded bores 148 in the body 114 and the external screw threads 144 being located on a distal end of each of the shoulder bolts 121. In illustrated embodiment, the threaded bores 148 and the shoulder bolts 121 are spaced circumferentially around the axis 118. It should be appreciated that while the shoulder bolts 121 will be desirable in many applications, other suitable structures having an elongate body and structure defining a retaining shoulder may be desirable in some applications, such as, for example, a structure similar to the shoulder bolts 121, but having the cylindrical shaft 127 fixed to the body 114 by other suitable means, such as by soldering, welding, flaring, and interference fit, etc., rather than by mating threads 144, 146.

As with the embodiment of FIGS. 1-9, the flange 122 of the embodiment in FIGS. 10-19 includes an annular end surface 156 spaced inboard of the stop shoulders 138 and facing opposite of the face surface 132, as best seen in FIGS. 12 and 15. The fluid port 116 includes an annular spacer surface 158 spaced inboard of the end surface 156. As an option, the coupling 110 can further include a movable spacer 160 that is sandwiched between the surfaces 156 and 158 to limit translation of the flange 122 along the longitudinal axis 118. In this regard, in the illustrated embodiment as shown in FIGS. 10, 13, 14 and 16, the flange 122 is located at its most extended position (most outboard position) when the spacer 160 is sandwiched between the surfaces 56 and 58. As best seen in FIG. 16, the spacer 160 includes a bore 161 that is mounted for rotation about the cylindrical shaft 127 of one of the shoulder bolts 121 so that the spacer 160 can be pivoted from a position, shown in FIGS. 12 and 16, wherein it is sandwiched between the surfaces 156 and 158, and a position, shown in FIG. 12, wherein it is not sandwiched between the surfaces 156 and 158 and the flange 122 is free to translate along the axis 116 between its extended and retracted positions. In this regard, the spacer 160 can further include a user engageable feature 162 that allows a user to grasp the spacer 160 to move it between the positions shown in FIGS. 16 and 17, with the illustrated embodiment showing the engageable feature 162 in the form of a finger opening 162. As best seen in FIG. 17, the spacer 160 also includes a concave surface 163 shaped to conform to the mount surface 124.

In the illustrated embodiment, the flange 122 is oval in shape and includes a pair of through holes or bores 164 configured to receive the thread fasteners 28 to fix the flange 122 to the mating flange 30. As with the embodiment of FIGS. 1-9, the face surface 132 of the flange 122 can be provided with other configurations, such as the configuration shown in FIG. 9, or can be a flat/planar and smooth surface such as shown in FIGS. 10-19. Again, it should be appreciated that any suitable face surface 132 and/or geometric shape, many of which are known, can be utilized for the flange 122.

As with the embodiment of FIGS. 1-9, the embodiment of FIGS. 10-17 further includes a valve assembly 70 as discussed in connection with the coupling 10 of FIGS. 1-9, with like reference numbers indicating like features of the valve assembly 70 in FIGS. 10-17. Again, as with the embodiment of the coupling 110 shown in FIGS. 1-9, the valve assembly 70 can be any suitable valve assembly as required for a particular application and accordingly, it should be understood that additional details of the valve assembly are not critical to an understanding of the invention and the claims are not intended to be limited to any specific valve assembly details unless expressly recited in one of the appended claims. Furthermore, it should be appreciated that the coupling 110 may not include any kind of a valve assembly and may simply be a straight pipe connection, or an angled pipe connection, or any other of the various water works or fluid flow related fittings.

In the illustrated embodiment, as best seen in FIG. 16, a portion of the valve stem 74 engages the feature 162 to prevent movement of the spacer 160 from the position sandwiched between the surfaces 156 and 158 when the valve stem is in a first position, but allows movement of the spacer 160 from between the surfaces 156 and 158 when the valve stem is in a second position, as shown in FIG. 17.

Figure 19:
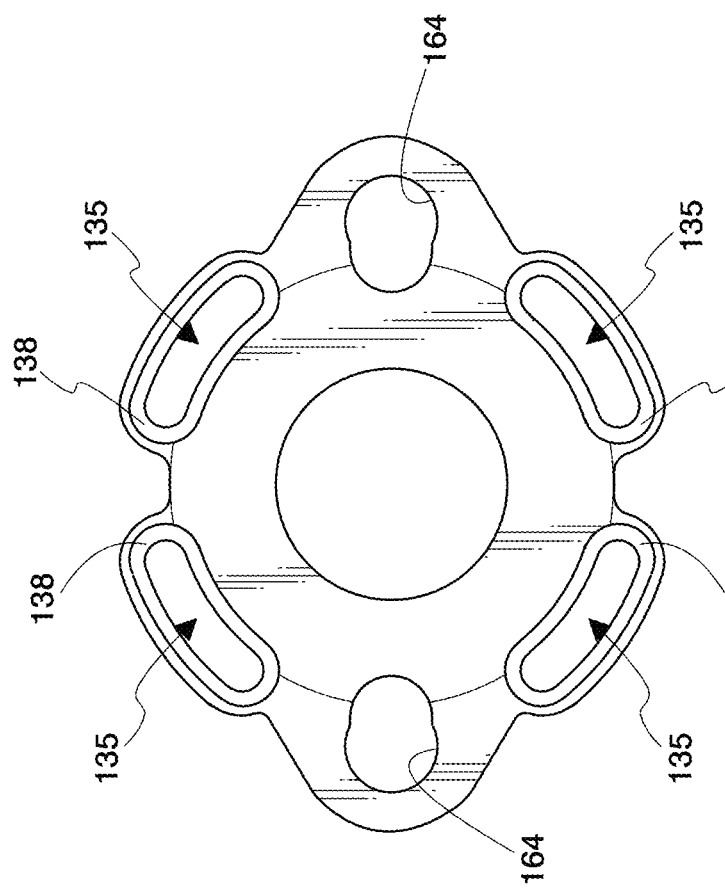
FIG. 19 is a front elevation view of the flange of FIG. 18.
Figure 18:
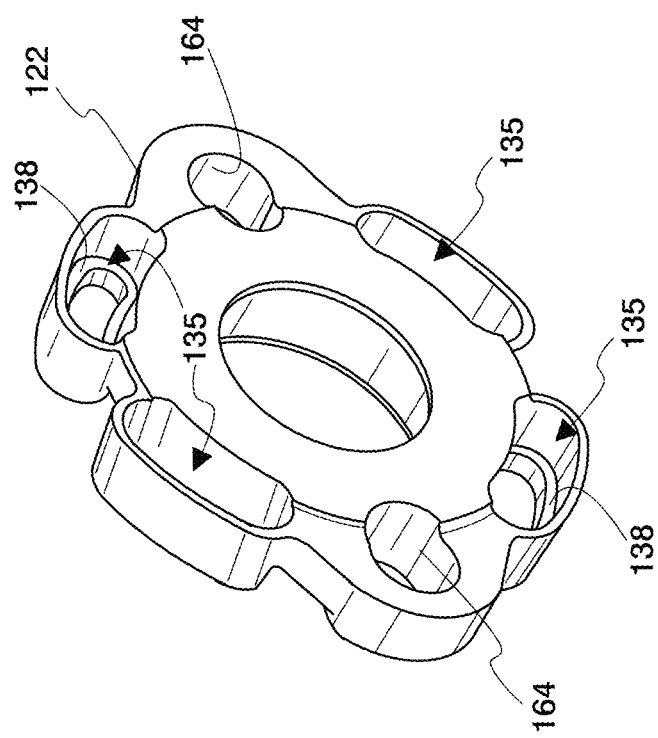
FIG. 18 is a perspective view of an alternate construction for the telescoping flange of the fluid coupling of FIGS. 11-17.

With references to FIGS. 18 and 19, an alternate embodiment of the flange 122 is shown that allows the flange 122 to be rotated about the axis 116 to align the bores 164 with the corresponding features of the mating flange 30. In this regard, the countersunk bores 135 are provided in the form of circumferentially extending countersunk slots 135 that allow the flange 122 to be rotated about the axis 116 while the corresponding shoulder bolts 121 are received in each of the countersunk slots 135.

It should be appreciated that the embodiments of the coupling 110 disclosed herein include a flange 122 that "telescopes" in and out, and that, for the embodiment of the flange shown in FIGS. 18 and 19, can also be rotated about the axis 116 to align the fastener features, such as the bores 167 with the corresponding features in the fluid flow device 12, such as a water meter 12. Because the flange 122 can telescope, it can be retracted away from the opposite flange 13 of the meter setter 11, thereby allowing room for the meter 12 to be either installed or removed from the stationary flange 13 of the meter setter 11. After the meter 12 is installed onto the stationary flange of the meter setter 11, the flange 122 can be telescoped to the proper length (and rotated if necessary for the flange 122 of FIGS. 18 and 19), thereby allowing the corresponding flange 30 of the meter 12 to be easily connected. It should be understood that this will eliminate stresses that could otherwise be present in the meter setter 11 and the forces that are often required to be applied to the meter setter 11 when installing the meter 12 into a conventional meter setter. It can also ensure correct alignment of the flange gaskets and threaded fasteners.

The invention claimed is:

1. A telescoping fluid coupling for use with a fluid flow device, the coupling comprising:
    a coupling body having a fluid port extending along a longitudinal axis;
    a retainer fixed to the body, the retainer including a retaining shoulder;
    a radially outwardly facing mount surface surrounding the fluid port; and
    a flange mounted to the fluid port for translation along the axis relative to the fluid port and configured to be fixed via a plurality of releasable fasteners to a mating flange to form a sealed connection therewith, the flange including:
        a face surface configured for sealed engagement with a mating face surface on a mating flange;
        a radially inwardly facing guide surface that surrounds the mount surface and extends longitudinally along the axis, the guide surface having a sliding fit with the mount surface to provide guided, sliding translation of the guide surface relative to the mount surface along the axis; and
        a stop shoulder located inboard of the retainer shoulder, the stop shoulder engaging the retaining shoulder to limit the translation of the flange along the axis relative to the fluid port; and
    at least one gasket located between the guide surface and the mount surface to create a seal between the guide surface and the mount surface;
    wherein the retainer is mounted on the fluid port, the mount surface is defined on the retainer, and the retaining shoulder extends between the fluid port and the mount surface.

2. The telescoping coupling of claim 1 wherein:
    the mount surface and the guide surface are cylindrical surfaces centered on the axis;
    the stop shoulder is an annular shoulder centered on the axis;
    the retaining shoulder is an annular shoulder centered on the axis; and
    the at least one gasket comprises an annular gasket.

3. The telescoping coupling of claim 1 wherein:
    the at least one gasket is a pair of annular gaskets; and
    the retainer includes a pair of radially outwardly opening annular grooves, one of the annular gaskets mounted in one of the annular grooves, the other of the annular gaskets mounted in the other of the annular grooves.

4. The telescoping coupling of claim 1 wherein the retainer is mounted on a distal end of the fluid port, and the fluid port includes external threads formed on the distal end that mate with internal threads formed on the retainer to mount the retainer to the fluid port.

5. The telescoping coupling of claim 1 wherein:

the fluid port includes a radially outwardly facing cylindrical surface extending from the retaining shoulder toward a remainder of the coupling body; and the flange includes a radially inwardly facing cylindrical surface that surrounds the radially outwardly facing cylindrical surface of the fluid port and extends from the stop shoulder toward the remainder of the coupling body, the radially outwardly facing cylindrical surface of the fluid port and the radially inwardly facing cylindrical surface of the flange having a fit that provides guided translation of the radially inwardly facing cylindrical surface of the flange along the radially outwardly facing cylindrical surface of the fluid port over a length of the radially outwardly facing cylindrical surface of the fluid port extending along the longitudinal axis.

\* \* \* \* \*